(12) United States Patent
Yoshikawa

(10) Patent No.: US 7,791,768 B2
(45) Date of Patent: Sep. 7, 2010

(54) IMAGE SCANNING DEVICE WITH TIME AUTHENTICATION REQUESTING FUNCTION

(75) Inventor: Hiroyasu Yoshikawa, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 883 days.

(21) Appl. No.: 11/703,151

(22) Filed: Feb. 7, 2007

(65) Prior Publication Data

US 2007/0188829 A1    Aug. 16, 2007

(30) Foreign Application Priority Data

Feb. 16, 2006    (JP) ............... 2006-038809

(51) Int. Cl.
*H04N 1/387*    (2006.01)
*H04N 1/40*    (2006.01)

(52) U.S. Cl. .................. 358/450; 358/452; 358/471

(58) Field of Classification Search ............... 382/103; 348/148; 386/52; 358/443, 448, 471, 505, 358/513, 450, 452
See application file for complete search history.

(56) References Cited

U.S. PATENT DOCUMENTS

| | | |
|---|---|---|
| 2003/0028495 A1 | 2/2003 | Pallante |
| 2003/0122950 A1* | 7/2003 | Anderson ............... 348/333.02 |
| 2004/0093493 A1 | 5/2004 | Bisbee et al. |
| 2005/0174597 A1* | 8/2005 | Ikeda ........................ 358/1.14 |
| 2006/0165283 A1* | 7/2006 | DeWitt et al. ................ 382/173 |
| 2007/0201815 A1* | 8/2007 | Griffin ......................... 386/52 |
| 2008/0165250 A1* | 7/2008 | Ekdahl et al. ................ 348/148 |
| 2008/0170748 A1* | 7/2008 | Albertson et al. ........... 382/103 |

FOREIGN PATENT DOCUMENTS

| | | |
|---|---|---|
| EP | 0 516 898 A1 | 12/1992 |
| EP | 0 940 945 A2 | 9/1999 |
| EP | 1 283 485 A1 | 2/2003 |

(Continued)

OTHER PUBLICATIONS

Notification of Reasons for Refusal dated Oct. 21, 2008 issued in corresponding Japanese Application No. 2006-038809.

(Continued)

*Primary Examiner*—Jerome Grant, III
(74) *Attorney, Agent, or Firm*—Westerman, Hattori, Daniels & Adrian, LLP

(57) ABSTRACT

An image scanning device with a time authentication requesting function enables documents, not subject to be converted into e-documents, to be easily converted into e-documents at a later date, and reduces costs required for assigning a timestamp. When a user instructs an account book e-document temporary scan, an original is scanned and stored. An account book temporary file name is assigned to the scanned original, and stored in an account book temporary folder. When the user instructs an estimate e-document temporary scan or a purchase order e-document temporary scan, scanned data of the original is assigned with a file name and stored in a temporary folder of each document type. Documents not subject to be converted into e-documents are stored under the same format as the e-document, and a timestamp is assigned collectively to necessary documents at a later date. Accordingly, costs required for the timestamp can be reduced.

2 Claims, 14 Drawing Sheets

FOREIGN PATENT DOCUMENTS

| | | |
|---|---:|---|
| EP | 1 330 107 A1 | 7/2003 |
| EP | 1 542 839 A2 | 4/2005 |
| JP | 11-338780 A | 12/1999 |
| JP | 2001-350405 A | 12/2001 |
| JP | 2002-197439 A | 7/2002 |
| JP | 2004-80611 A | 3/2004 |
| JP | 2005-123980 A | 5/2005 |
| JP | 2005-1511358 A | 6/2005 |
| JP | 2005-267083 A | 9/2005 |
| WO | WO 01/03363 A1 | 1/2001 |

OTHER PUBLICATIONS

European Office Action dated Dec. 14, 2007, issued in corresponding European patent application No. 07 100 247.1.

European Search Report dated May 10, 2007, issued in corresponding European patent application No. 07 10 0247.

C. Adams et al., Internet X. 509 Public Key Infrastructure Time Stamp Protocol (TSP), Internet Draft, PKIX Working Group, Oct. 1999.

* cited by examiner

FIG. 5

| NO | FILE NAME | PERIOD OF VALIDITY | PERIOD OF STORAGE |
|---|---|---|---|
| 1 | account book2006-01-31-1 | 2009.01.31 | 2016.01.31 |
| 2 | account book2005-10-20-1 | 2008.10.20 | 2015.10.20 |
| 3 | taccount book2006-01-28-1 | | |
| 4 | taccount book2006-02-02-1 | | |
| ⋮ | ⋮ | ⋮ | ⋮ |

FIG. 6
SCANNING WILL BE EXECUTED.
 E-DOCUMENT SCAN
 E-DOCUMENT TEMPORARY SCAN
 NORMAL SCAN
 ASSIGN TIMESTAMP
EXECUTE    CANCEL

FIG. 7

E-DOCUMENT SCAN WILL BE EXECUTED.

☑ ACCOUNT BOOK E-DOCUMENT SCAN

☐ ESTIMATE E-DOCUMENT SCAN

☐ PURCHASE ORDER E-DOCUMENT SCAN

EXECUTE      CANCEL

FIG. 9

E-DOCUMENT TEMPORARY SCAN WILL BE EXECUTED.

- [✓] ACCOUNT BOOK E-DOCUMENT TEMPORARY SCAN
- [ ] ESTIMATE E-DOCUMENT TEMPORARY SCAN
- [ ] PURCHASE ORDER E-DOCUMENT TEMPORARY SCAN

[EXECUTE] [CANCEL]

FIG. 11

TIMESTAMP WILL BE ASSIGNED TO TEMPORARY E-DOCUMENT.

☑ ACCOUNT BOOK TEMPORARY E-DOCUMENT

☐ ESTIMATE TEMPORARY E-DOCUMENT

☐ PURCHASE ORDER TEMPORARY E-DOCUMENT

EXECUTE    CANCEL

FIG. 13

LIST OF ACCOUNT BOOK TEMPORARY E-DOCUMENTS

- [✓] taccount book2006-01-11-1
- [✓] taccount book2006-01-11-2
- [✓] taccount book2006-02-03-1

⋮

[ EXECUTE ]   [ CANCEL ]

FIG. 14

EDIT DOCUMENT TO BE ASSIGNED WITH TIMESTAMP

NAME OF DOCUMENT

PERIOD OF STORAGE OF DOCUMENT

TYPE OF DOCUMENT

☐ ACCOUNT BOOK E-DOCUMENT

☐ ESTIMATE E-DOCUMENT

☑ PURCHASE ORDER E-DOCUMENT

EXECUTE    CANCEL

IMAGE SCANNING DEVICE WITH TIME AUTHENTICATION REQUESTING FUNCTION

BACKGROUND OF THE INVENTION

1. Field of the Invention

The present invention relates to an image scanning device with a time authentication requesting function of a digital Multi Function Peripheral (MFP) or the like which assigns a timestamp to a document image scanned by a scanner and stores the document image assigned with the timestamp.

2. Description of the Related Art

Recently, a digital MFP including a copier function, a facsimile function, a printer function, and a scanner function or the like assigns a timestamp to a document image scanned by a scanner, and stores the document image as an e-document. That is, since digital data can be easily altered compared with a paper document, timestamp technology has been used. The timestamp is technology for certifying time when an electronic document has been fixed. The timestamp certifies from when such a document has been existing, and a fact that the document has not been altered by third parties and also a creator himself from the time when the document was created.

When adopting such timestamp technology, first, a device transmits a hash value of an electronic document to a Time Stamping Authority (TSA). The TSA encodes the hash value and information of correct time clocked by an electronic clock, and returns to the device as a timestamp. The device saves the received timestamp along with the electronic document.

When verifying such an e-document, the device decodes the timestamp, and confirms the time information of the timestamp. Then, the device compares the hash value of the electronic document, which has been separately calculated, with the hash value included in the timestamp. Accordingly, verification can be carried out as to whether or not the e-document had been altered. Further, the hash value is a fixed length value generated using a one-way function (hash function) that is irreversible from a given original text. The hash value is also known as a message digest, etc. Since it is extremely difficult to obtain the original text from the hash value and to create different documents having the same hash value, it is possible to confirm whether or not the original text is identical by comparing the hash values.

As described above, the conventional digital MFP can store the scanned document along with the timestamp as an e-document. However, since costs are required for requesting the timestamp, a large amount of costs would be required to provide all documents in a form of e-documents. Meanwhile, when one wishes to destroy a paper document, although such a document may not be required to be converted into an e-document at such time, the document may be required to be converted into an e-document at a later date. Accordingly, the document could not be destroyed after all, and a large volume of documents were required to be kept.

SUMMARY OF THE INVENTION

In order to overcome the problems described above, preferred embodiments of the present invention provide an image scanning device with a time authentication requesting function which scans a document, not subject to be converted into an e-document, under the same format as an e-document and stores data without assigning a timestamp, to enable the stored data to be easily converted into an e-document later and to reduce costs required for the timestamp.

According to a first aspect of the present invention, an image scanning device with a time authentication requesting function includes an image scanning unit and a control unit. The image scanning unit scans a document and generates an image signal. The control unit assigns a timestamp to the image signal generated by the image scanning unit, and stores the image signal assigned with the timestamp in a storage unit. The control unit includes a temporary storing function for storing image data in the storage unit without assigning the timestamp to the image data.

According to a second aspect of the present invention, the control unit includes a function for assigning a timestamp by selecting image data, which is stored in the storage unit and not assigned with a timestamp.

According to the above-described image scanning device with the time authentication requesting function, a document that is not subject to be converted into an e-document is scanned under the same format as the e-document, and such a scanned document is stored without being assigned with a timestamp. When the stored document is required to be provided as an e-document at a later date, it is not necessary to take out a paper document and to scan the paper document again. As a result, the number of paper documents to be stored can be reduced. Moreover, e-documents to be assigned with a timestamp may be selected from e-documents stored without being assigned with a timestamp, and a timestamp may be assigned collectively to the selected e-documents. As a result, costs required for assigning the timestamp can be reduced.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 illustrates an example of data stored in a management file.

FIG. 6 illustrates an example of a scan execution screen.

FIG. 7 illustrates an example of an e-document scan execution screen.

FIG. 9 illustrates an example of an e-document temporary scan execution screen.

FIG. 11 illustrates an example of a temporary e-document selection screen.

FIG. 13 illustrates an example of a display screen displaying e-documents stored in an account book temporary folder.

FIG. 14 illustrates an example of an editing screen of a document to which a timestamp is to be assigned.

DETAILED DESCRIPTION OF PREFERRED EMBODIMENTS

Figure 1:
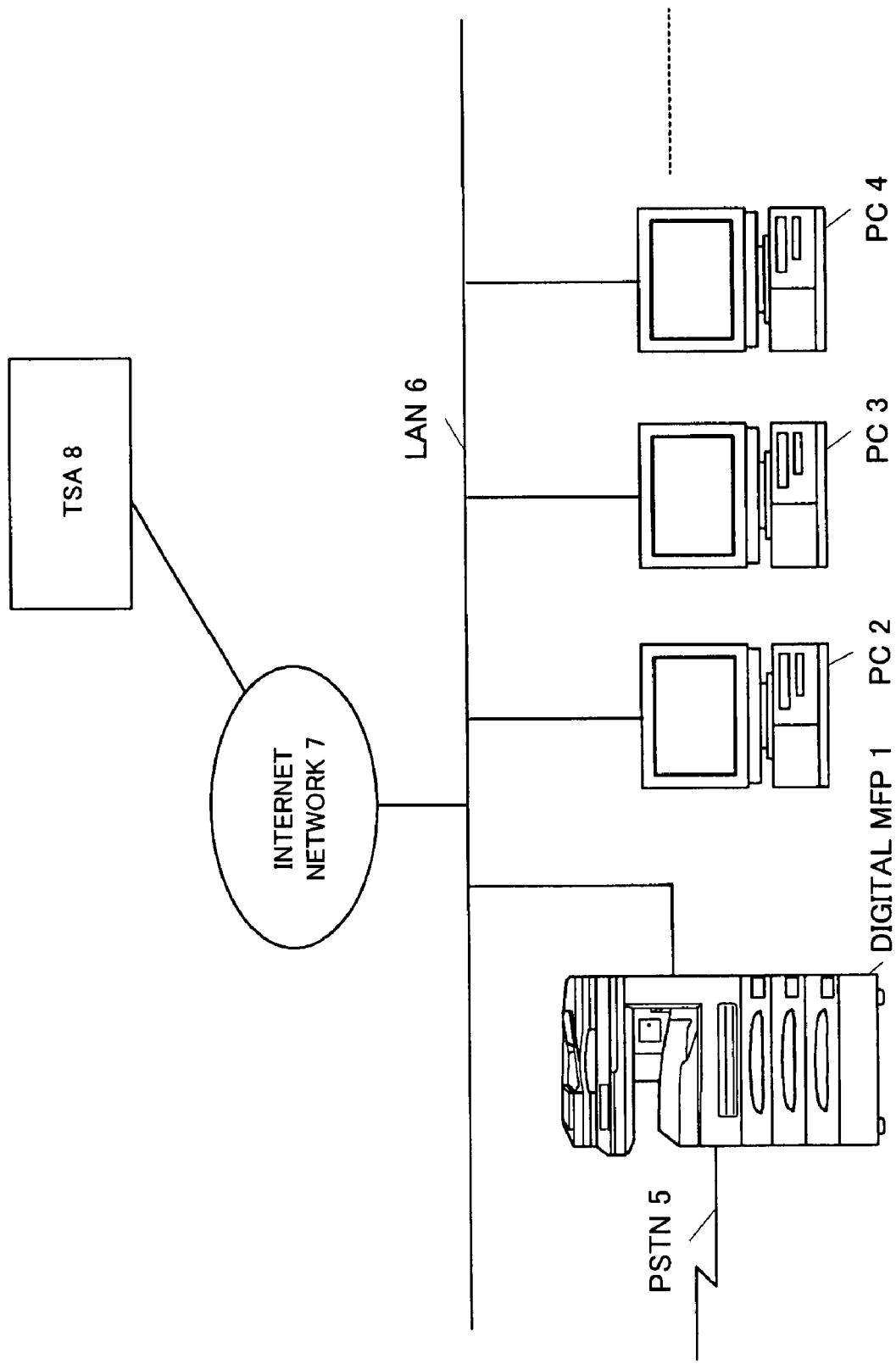
FIG. 1 illustrates an example of a network configuration of a system including a digital MFP.
Figure 2:
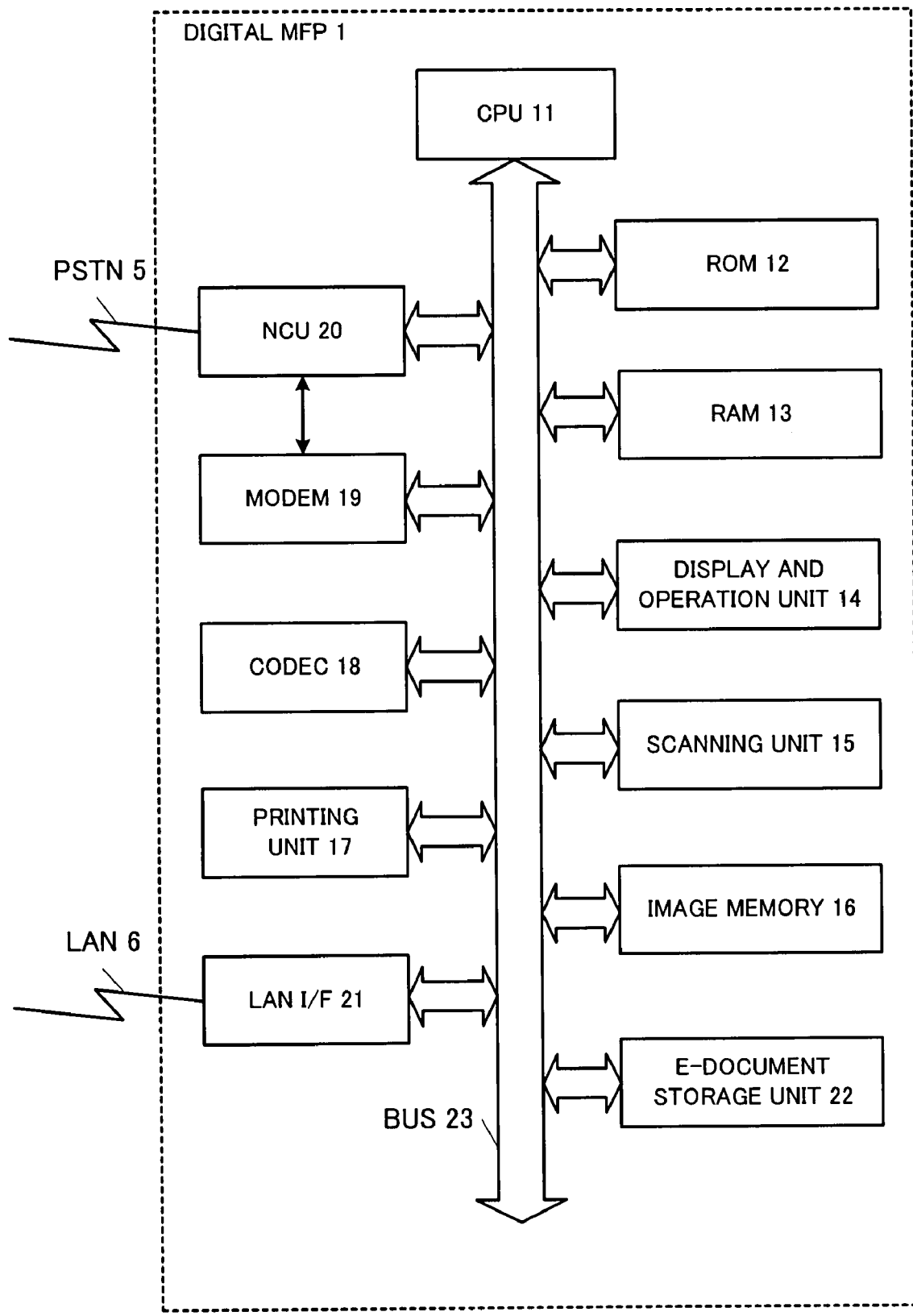
FIG. 2 is a block diagram illustrating a hardware configuration of the digital MFP.

A description will be made of an example of a digital MFP as an image scanning device with a time authentication requesting function according to a preferred embodiment of the present invention. FIG. 1 illustrates an example of a network configuration of a system including a digital MFP. FIG. 2 is a block diagram illustrating a hardware configuration of the digital MFP.

In FIG. 1, reference numeral 1 denotes a digital MFP, reference numerals 2, 3, 4, etc. respectively denote a Personal Computer (PC), reference numeral 5 denotes a Public Switched Telephone Network (PSTN), 6 denotes a Local Area Network (LAN), 7 denotes an Internet network, and 8 denotes a TSA. The digital MFP 1 includes functions of a copy mode, a printer mode, and a facsimile mode, and also includes a mail transmitting function. The digital MFP 1 is connected to the PSTN 5 and the LAN 6. A plurality of PCs 2, 3, 4, etc. as terminal devices are connected to the LAN 6. The LAN 6 is also connected to the Internet network 7. The digital MFP 1 can transmit and receive mail via the Internet network 7. The TSA 8 is a time stamping authority. When the TSA 8 receives a hash value of scanned data from the digital MFP 1 via the Internet network 7, the TSA 8 encodes the received hash value along with information of accurate time clocked by an electronic clock. Then, the TSA 8 returns the encoded hash value as a timestamp.

As illustrated in FIG. 2, the digital MFP 1 includes a Central Processing Unit (CPU) 11, a Read Only Memory (ROM) 12, a Random Access Memory (RAM) 13, a display and operation unit 14, a scanning unit 15, an image memory 16, a printing unit 17, a Coder-Decoder (CODEC) 18, a Modulator-Demodulator (MODEM) 19, a Network Control Unit (NCU) 20, a LAN interface (I/F) 21, and an e-document storage unit 22. Each of the units 11 through 22 is connected via a bus 23.

The CPU 11 controls each of hardware components of the digital MFP 1 via the bus 23. The CPU 11 executes various programs stored in the ROM 12. The ROM 12 previously stores various programs and operation messages or the like necessary for an operation of the digital MFP 1. The RAM 13 is formed of a Static RAM (SRAM) or the like. The RAM 13 stores temporary data that generates when a program is executed.

Figure 3:
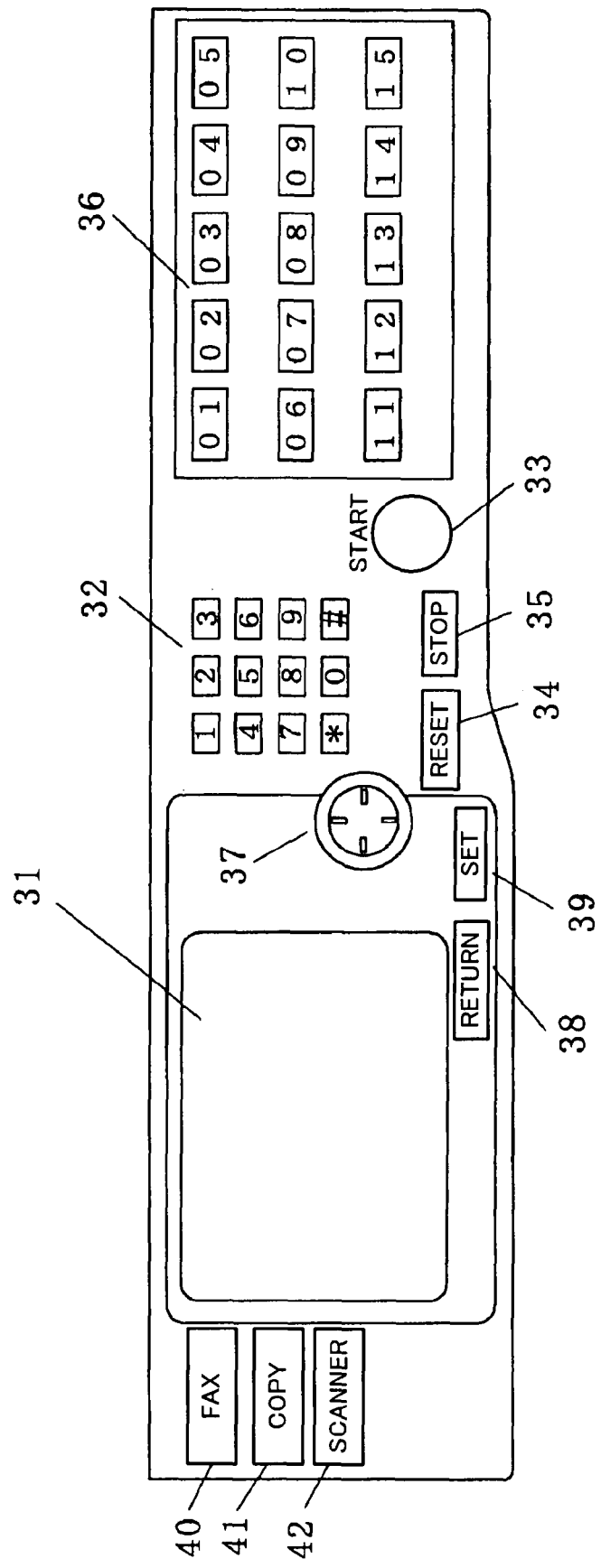
FIG. 3 illustrates an example of a detailed structure of a display and operation unit.

The display and operation unit 14 includes a display unit, which displays an operation status of the digital MFP 1 and displays an operation screen for various functions, and a plurality of keys for operating the digital MFP 1. As illustrated in FIG. 3, the display and operation unit 14 includes a Liquid Crystal Display (LCD) display unit 31 as the display unit and a plurality of operation keys. Touch-screen switches are provided in the LCD display unit 31. By pressing an item displayed on the LCD display unit 31, it becomes possible to select a corresponding item or to execute a function. As the operation keys, the display and operation unit 14 includes a ten-key numeric pad 32, a start key 33, a reset key 34, a stop key 35, a plurality of one-touch dial keys 36, a cross key 37, a return key 38, a set key 39, a FAX switching key 40, a copy switching key 41, and a scanner switching key 42 or the like. Further, the LCD display unit 31 may substitute a portion or all of these operation keys.

The scanning unit 15 includes an original placing table for an Auto Document Feeder (ADF) and/or a Flat Bed Scanner (FBS) or the like. The scanning unit 15 scans an original by a scanner using a Charge-Coupled Device (CCD) or the like, and outputs dot image data. The image memory 16 includes a Dynamic RAM (DRAM) or the like. The image memory 16 stores transmission image data, received image data, or image data scanned by the scanning unit 15. The printing unit 17 includes an electrophotographic printer device. The printing unit 17 prints out received data, copied original data, or print data transmitted from the remote PCs 2, 3, 4, etc.

The CODEC 18 encodes and decodes according to a prescribed protocol. For transmitting image data scanned from an original, the CODEC 18 encodes the image data by the Modified Huffman (MH), the Modified Read (MR) or the Modified MR (MMR) scheme. The CODEC 18 decodes image data received from a remote terminal. The CODEC 18 also encodes and decodes according to the Tagged Image File Format (TIFF) or the like, which is an image format generally used as a file attachable to electronic mail.

The MODEM 19 is connected to the bus 23, and includes functions as a faxmodem capable of carrying out facsimile communication. The MODEM 19 is also connected to the NCU 20, which is also connected to the bus 23. The NCU 20 is hardware for closing and releasing an analog communication line. The NCU 20 connects the MODEM 19 to the PSTN 5 according to necessity. The LAN I/F 21 is connected to the LAN 6. The LAN I/F 21 receives a signal from the Internet network 7, and transmits a signal and/or data to the LAN 6. The LAN I/F 21 executes an interface processing such as a signal conversion and a protocol conversion.

Figure 4:
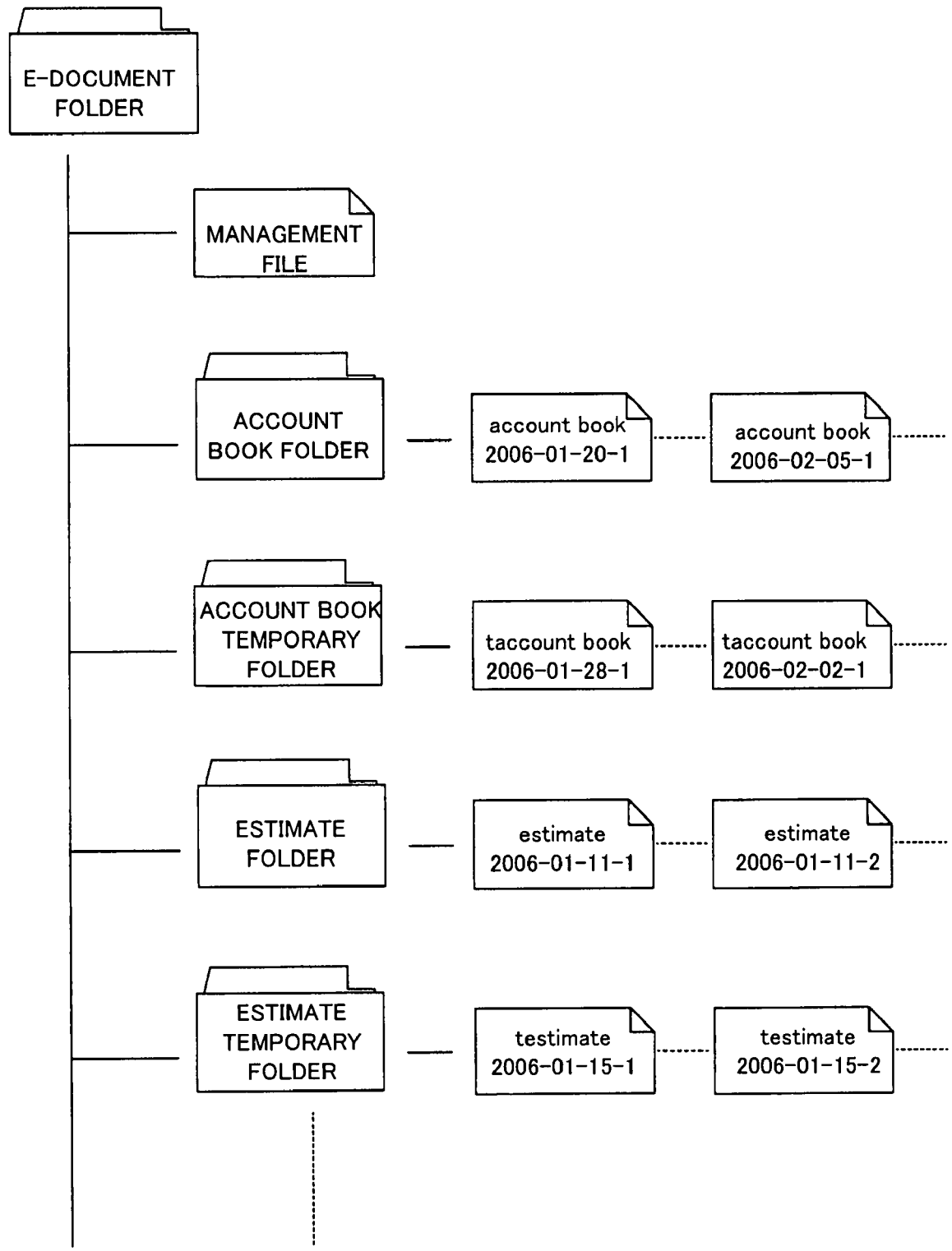
FIG. 4 illustrates a file structure of an e-document storage unit.

The e-document storage unit 22 is a storage unit which stores e-documents per document type. As illustrated in FIG. 4, the e-document storage unit 22 includes a management file of e-documents, and a folder and a temporary folder for each of following documents: account book, estimate, memorandum, and/or purchase order, etc. Each document folder stores a scanned document assigned with a file name and a timestamp. Further, the file name of the document folder includes a character string capable of identifying a document name, a date, and a consecutive number. Each temporary document folder stores a scanned document assigned with a file name including a character string capable of identifying a document name, a date, and a consecutive number. As illustrated in FIG. 5, for the e-documents, the management file stores a file name, a period of validity of the timestamp, and a period of storage of the data. For the temporary e-documents, the management file stores only the file name.

When carrying out facsimile transmission, the scanning unit 15 scans image data of an original, and the CODEC 18 compresses the scanned image data. Then, the image data is stored in the image memory 16. The compressed image data is retrieved from the image memory 16, and the MODEM 19 modulates the retrieved image data. Then, the image data is transmitted from the NCU 20 to a destination via the PSTN 5. When receiving facsimile, the MODEM 19 demodulates the received image data, and the image data is stored in the image memory 16. Then, the CODEC 18 decodes the image data, and the printing unit 17 prints out the image data.

The digital MFP 1 can scan a document and store the scanned document as an e-document or a temporary e-document as described above. In the following, a description will be made of processes when carrying out e-document scan. When the user presses the scanner switching key 42 of the display and operation unit 14, the LCD display unit 31 of the display and operation unit 14 displays a scan execution screen illustrated in FIG. 6. This screen displays a selection screen for selecting either "e-document scan", "e-document temporary scan", "normal scan", or "assign timestamp". After either one of the functions is pressed, when an "EXECUTE" button is pressed, the digital MFP 1 executes the selected function.

When the user selects an e-document scan in the scan execution screen illustrated in FIG. 6 and presses the "EXECUTE" button, the LCD display unit 31 of the display and operation unit 14 displays an e-document scan execution screen illustrated in FIG. 7. This screen displays a selection screen for selecting a type of a document to be executed with e-document scan, e.g. an account book e-document scan, an estimate e-document scan, and a purchase order e-document scan. After pressing and selecting either one of the e-document scans and pressing the "EXECUTE" button, the digital MFP 1 executes the e-document scan.

Figure 8:
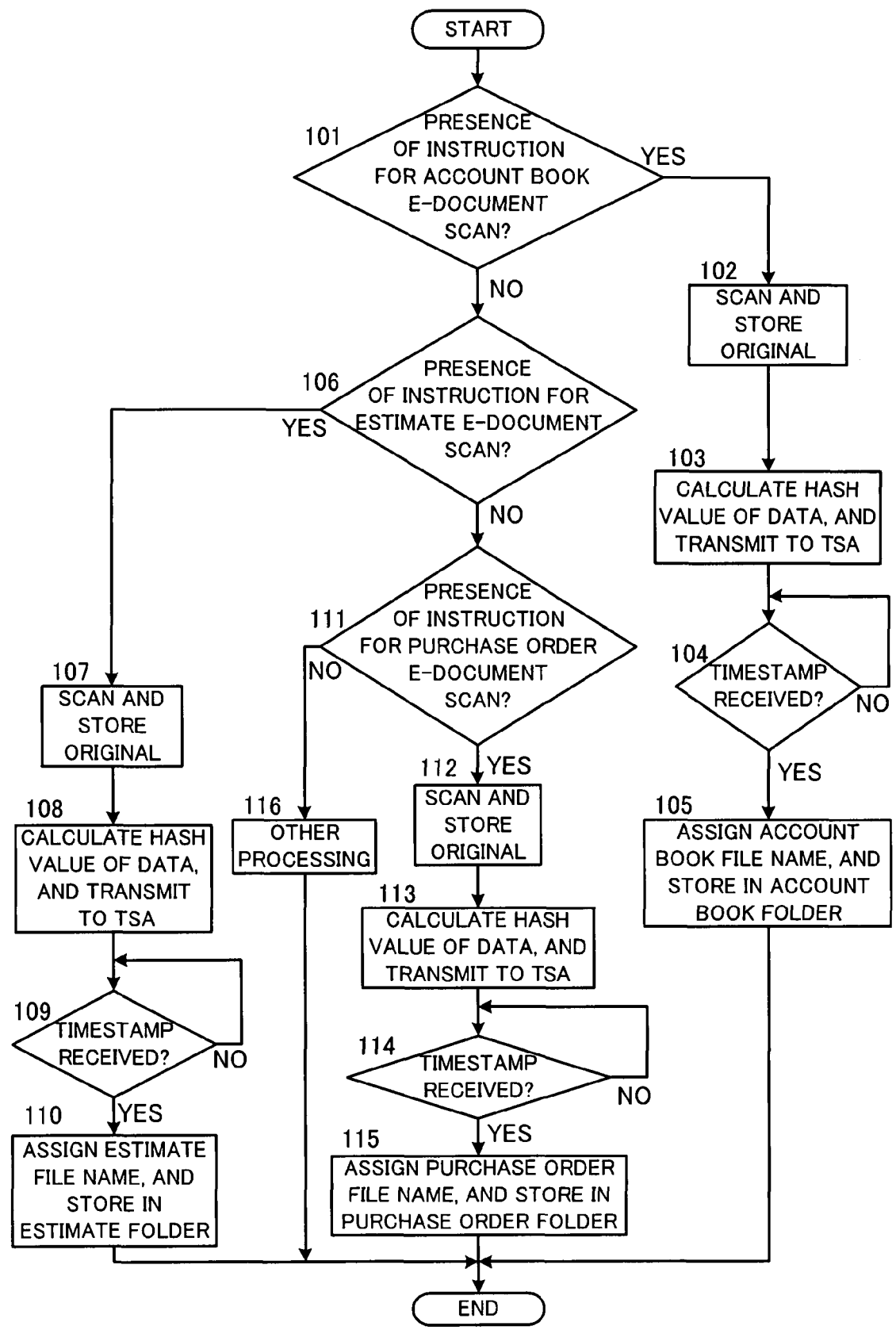
FIG. 8 is a flowchart illustrating processes carried out when executing e-document scan.

FIG. 8 is a flowchart illustrating processes carried out by the CPU 11 when executing the e-document scan. After selecting the e-document scan for one of the document types, when the "EXECUTE" button is pressed, the CPU 11 starts an e-document scan program illustrated in the flowchart of FIG. 8. The CPU 11 determines whether or not the user has instructed an account book e-document scan (step 101). When the CPU 11 determines that the user has instructed the account book e-document scan, image data of an original is scanned by the scanning unit 15, compressed by the CODEC 18, and stored in the image memory 16 (step 102).

Next, the CPU 11 calculates a hash value of the data stored in the image memory 16, and transmits the calculated hash value to the TSA 8 via the LAN I/F 21, the LAN 6 and the Internet network 7 (step 103). After transmitting hash value data to the TSA 8, the CPU 11 determines whether or not a timestamp has been received from the TSA 8 (step 104). When receiving the timestamp from the TSA 8, the CPU 11 creates an account book file name by "account book", "date" and "consecutive number". Then, the scanned data and the timestamp are stored in the account book folder of the e-document storage unit 22 under the created file name. In addition, the file name, the period of validity of the timestamp, and the period of storage of the e-document are stored in the management file (step 105). Further, a term of storage of the e-document can be designated for each document type, for example, ten years for account books, or five years for purchase orders. Therefore, the period of storage can be automatically decided according to a creation date of the e-document and the term of storage for the type of such e-document.

Meanwhile, when the CPU 11 determines at step 101 that the user has not instructed the account book e-document scan, the CPU 11 determines whether or not the user has instructed the estimate e-document scan (step 106). When the CPU 11 determines that the user has instructed the estimate e-document scan, image data of the original is scanned and stored (step 107). Then, the CPU 11 calculates a hash value of the scanned data, and transmits the hash value to the TSA 8 (step 108). Next, the CPU 11 determines whether or not a timestamp has been received from the TSA 8 (step 109). When receiving a timestamp from the TSA 8, the CPU 11 creates a file name by "estimate", "date" and "consecutive number". The CPU 11 stores the scanned data and the timestamp under the created file name in the estimate folder of the e-document storage unit 22, and stores the file name, the period of validity of the timestamp, the period of storage of e-document in the management file (step 110).

When the CPU 11 determines at step 106 that the user has not instructed the estimate e-document scan, the CPU 11 determines whether or not the user has instructed the purchase order e-document scan (step 111). When the CPU 11 determines that the user has instructed the purchase order e-document scan, the image data of the original is scanned and stored (step 112). Then, the CPU 11 calculates the hash value of the scanned data, and transmits the hash value to the TSA 8 (step 113).

Next, the CPU 11 determines whether or not a timestamp has been received from the TSA 8 (step 114). When receiving the timestamp from the TSA 8, the CPU 11 creates a file name by "purchase order", "date" and "consecutive number". The CPU 11 stores the scanned data and the timestamp under the created file name in the purchase order folder of the e-document storage unit 22. The CPU 11 also stores the file name, the period of validity of the timestamp, and the period of storage of the e-document in the management file (step 115). When the CPU 11 determines at step 111 that the user has not instructed the purchase order e-document scan, the CPU 11 executes an e-document scan of other document type (step 116).

When the user selects the e-document temporary scan in the scan execution screen illustrated in FIG. 6 and presses the "EXECUTE" button, the LCD display unit 31 of the display and operation unit 14 displays an e-document temporary scan execution screen illustrated in FIG. 9. This screen displays a selection screen for selecting a document type to be executed with the e-document temporary scan such as an account book e-document temporary scan, an estimate e-document temporary scan, and a purchase order e-document temporary scan. After pressing and selecting either one of the e-document temporary scans, when the "EXECUTE" button is pressed, the digital MFP 1 executes the e-document temporary scan.

Figure 10:
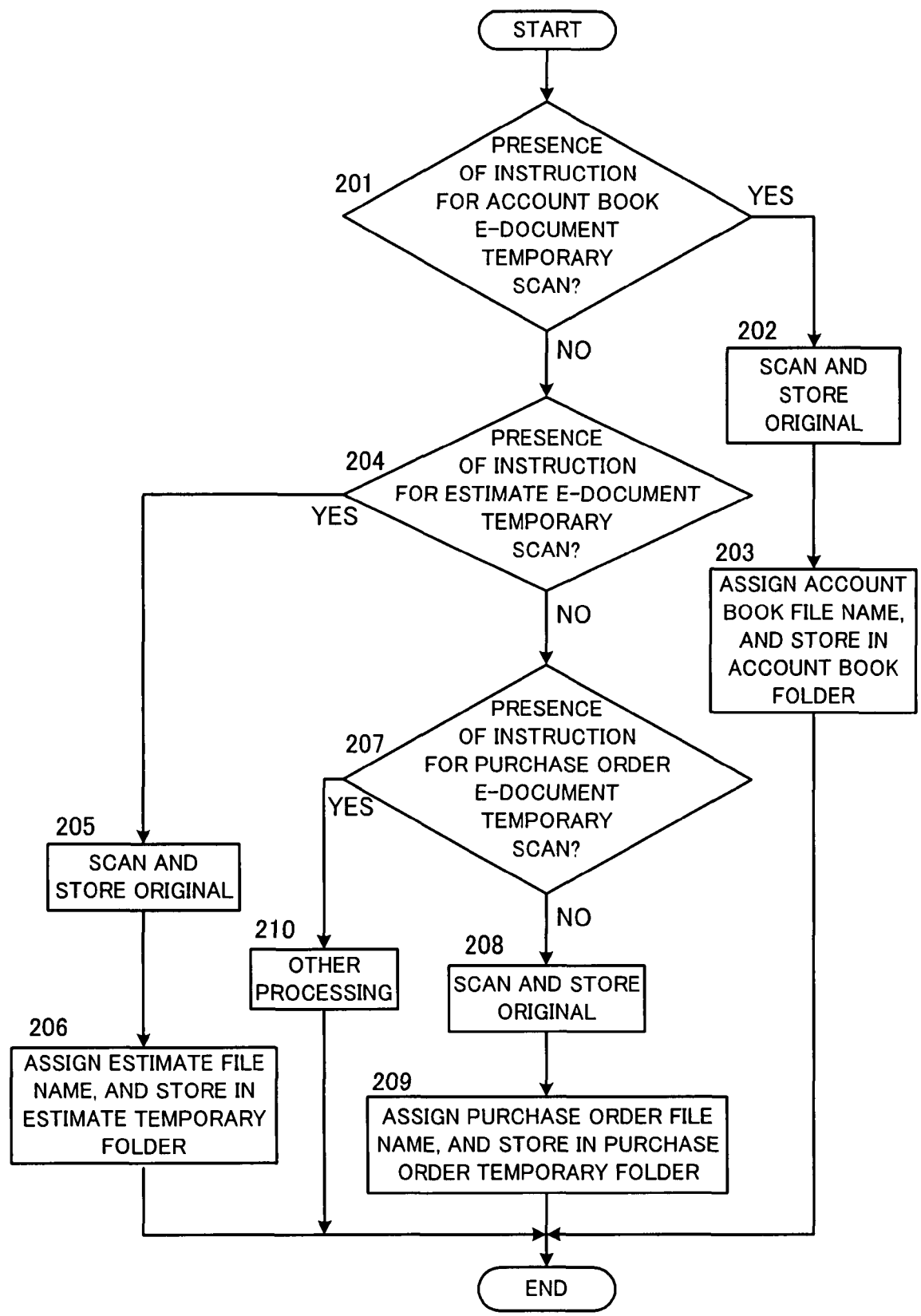
FIG. 10 is a flowchart illustrating processes carried out when executing e-document temporary scan.

FIG. 10 is a flowchart illustrating processes carried out by the CPU 11 when executing the e-document temporary scan. After the e-document temporary scan of either one of the document types is selected, when the "EXECUTE" button is pressed, the CPU 11 starts the e-document temporary scan program illustrated in the flowchart of FIG. 10. The CPU 11 determines whether or not the user has instructed the account book e-document temporary scan (step 201). When the CPU 11 determines that the user has instructed the account book e-document temporary scan, the image data of the original is scanned by the scanning unit 15, compressed by the CODEC 18, and stored in the image memory 16 (step 202). Then, the CPU 11 creates an account book file name by "taccount book", "date" and "consecutive number". The CPU 11 stores the scanned data under the created file name in the account book temporary folder of the e-document storage unit 22, and stores the file name in the management file (step 203).

Meanwhile, when the CPU 11 determines at step 201 that the user has not instructed the account book e-document temporary scan, the CPU 11 determines whether or not the user has instructed an estimate e-document temporary scan (step 204). When the CPU 11 determines that the user has instructed the estimate e-document temporary scan, in the same manner as described above, the image data of the original is scanned and stored (step 205). Then, the CPU 11 creates a file name including "testimate", "date", and "consecutive number". The scanned data is stored under the created file name in the estimate temporary folder of the e-document storage unit 22, and the file name is stored in the management file (step 206).

When the CPU 11 determines at step 204 that the user has not instructed the estimate e-document temporary scan, the CPU 11 determines whether or not the user has instructed the purchase order e-document temporary scan (step 207). When the CPU 11 determines that the user has instructed the purchase order e-document temporary scan, in the same manner as described above, the image data of the original is scanned and stored (step 208). Then, the CPU 11 creates a file name including "tpurchase order", "date", and "consecutive number". The scanned data is stored under the created file name in the purchase order temporary folder, and the file name is stored in the management file (step 209). When the CPU 11 determines at step 207 that the user has not instructed the purchase order e-document temporary scan, the CPU 11 executes e-document temporary scan of other document type (step 210).

Figure 12:
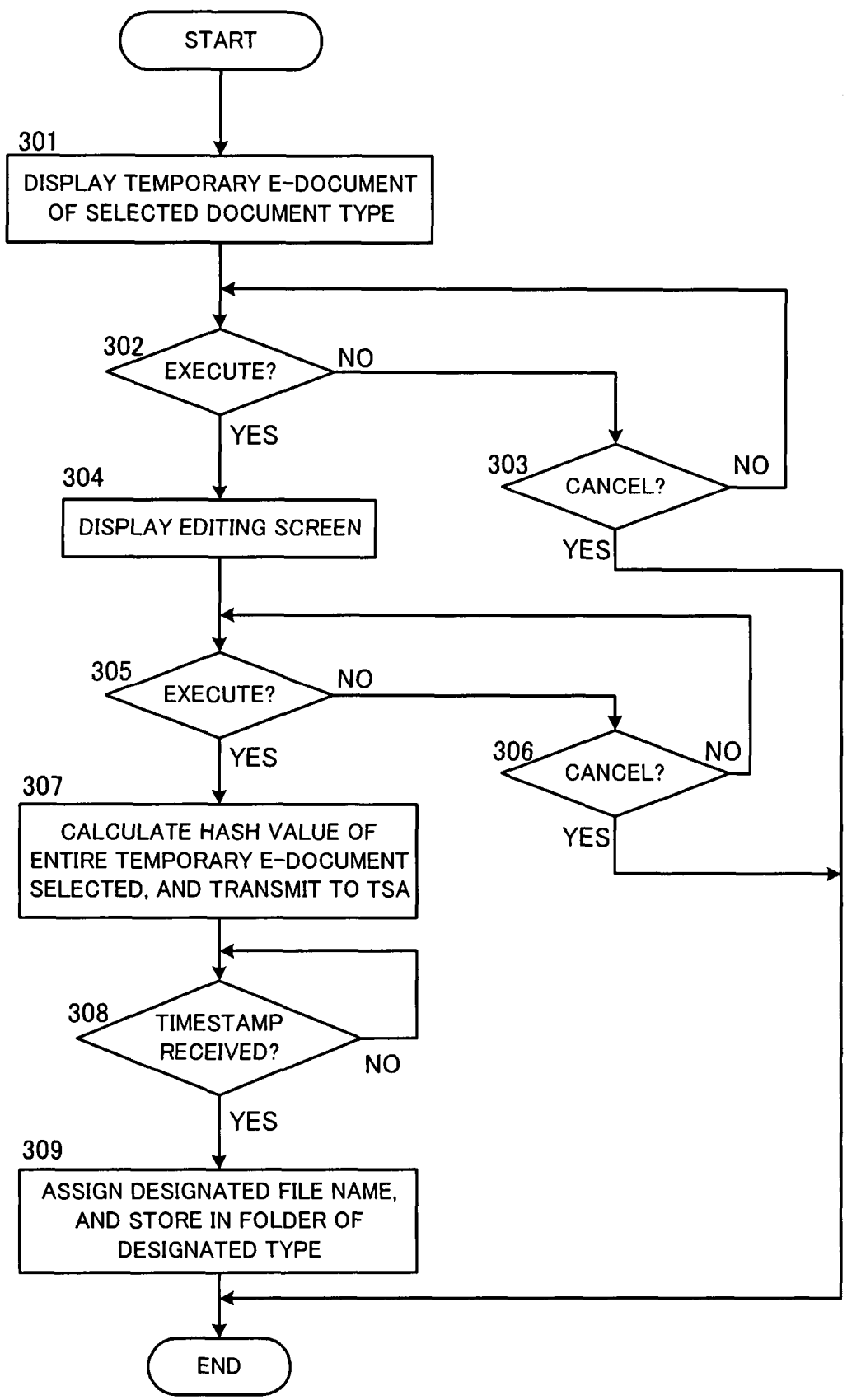
FIG. 12 is a flowchart illustrating processes carried out when assigning a timestamp.

Next, a description will be made of processes for selecting a necessary document from temporary e-documents, and assigning a timestamp. When the user selects "assign timestamp" in the scan execution screen illustrated in FIG. 6 and presses the "EXECUTE" button, the LCD display unit 31 of the display and operation unit 14 displays a temporary e-document selection screen illustrated in FIG. 11. This screen displays a selection screen for selecting a type of a temporary e-document to which a timestamp will be assigned, e.g., an account book temporary e-document, an estimate temporary e-document, and a purchase order temporary e-document. After either one of the temporary e-documents is pressed and selected, when the "EXECUTE" button is pressed, the CPU 11 starts a timestamp assigning program illustrated in the flowchart of FIG. 12. The LCD display unit 31 of the display and operation unit 14 displays the temporary e-document of the document type selected by the user (step 301).

For example, after the user selects the account book temporary e-document in the temporary e-document selection screen illustrated in FIG. 11, when the user presses the "EXECUTE" button, as illustrated in FIG. 13, the LCD display unit 31 of the display and operation unit 14 displays account book temporary e-documents stored in the account book temporary folder of the e-document storage unit 22. After the user selects a temporary e-document to which a timestamp is to be assigned, when the user presses the "EXECUTE" button, a timestamp is assigned to the selected temporary e-document.

After displaying the temporary e-document of the selected document type, the CPU 11 determines whether or not the "EXECUTE" button has been pressed in the screen illustrated in FIG. 13 (step 302). When the CPU 11 determines that the "EXECUTE" button has not been pressed, the CPU 11 determines whether or not a "CANCEL" button has been pressed (step 303). When the CPU 11 determines that the "CANCEL" button has not been pressed, the CPU 11 returns to step 302 and determines again whether or not the "EXECUTE" button has been pressed. When the CPU 11 determines that the "CANCEL" button has been pressed, the CPU 11 ends the program, and displays the temporary e-document selection screen illustrated in FIG. 11 on the LCD display unit 31 of the display and operation unit 14 again.

When the CPU 11 determines at step 302 that the "EXECUTE" button has been pressed, the LCD display unit 31 of the display and operation unit 14 displays an editing screen for editing a document to be assigned with the timestamp illustrated in FIG. 14 (step 304). As illustrated in the drawing, the editing screen displays an entry section for entering a name of a document to be assigned with a timestamp, an entry section for entering a period of storage of the document, and a selection section for selecting a document type. Therefore, any document name and any period of storage of the document may be entered. In addition, a document type may be changed.

After displaying the editing screen, the CPU 11 determines whether or not the "EXECUTE" button has been pressed in the editing screen illustrated in FIG. 14 (step 305). When the CPU 11 determines that the "EXECUTE" button has not been pressed, the CPU 11 determines whether or not the "CANCEL" button has been pressed (step 306). When the CPU 11 determines that the "CANCEL" button has not been pressed, the CPU 11 returns to step 305, and determines again whether or not the "EXECUTE" button has been pressed. When the CPU 11 determines that the "CANCEL" button has been pressed, the CPU 11 ends the program, and in the same manner as described above, the LCD display unit 31 of the display and operation unit 14 displays again the temporary e-document selection screen illustrated in FIG. 11.

Meanwhile, when the CPU 11 determines at step 305 that the "EXECUTE" button has been pressed, the CPU 11 calculates a hash value of the entire data of the temporary e-document selected in the temporary e-document selection screen of FIG. 13, and transmits the hash value to the TSA 8 (step 307). Next, the CPU 11 determines whether or not the timestamp has been received from the TSA 8 (step 308). When receiving the timestamp from the TSA 8, the entire data of the selected temporary e-document and the timestamp are stored under the file name entered from the editing screen of FIG. 14 in the e-document folder of the document type selected in the editing screen. The file name, the period of validity of the timestamp, and the period of the e-document are stored in the management file (step 309).

As described above, a document not subject to be converted into an e-document is scanned under the same format as the e-document, and the data is stored without being assigned with a timestamp. Accordingly, when the data is required to be provided as an e-document at a later date, it is not necessary to take out a paper document and scan the document again. As a result, a number of paper documents to be stored can be reduced. In addition, e-documents to be assigned with a timestamp can be selected from e-documents stored without being assigned with a timestamp, and a timestamp can be assigned collectively to the selected e-documents. As a result, costs required for assigning the timestamp can be reduced.

Further, in the above-described preferred embodiment, the editing screen for editing a document to be assigned with a timestamp is displayed to enable a document name, a period of storage of the document, and a document type to be designated. As another example, without displaying the editing screen, in the same manner as the e-document scan, a file name can be created from "selected document type", for example, "purchase order", "date", and "consecutive number". Then, the document may be stored under the created file name in the e-document folder, and the period of storage may be entered automatically.

In the above-described preferred embodiment, when executing the e-document temporary scan, a document type is selected and the temporary scan is executed. As another example, without distinguishing document types, all documents may be stored in the same temporary folder as temporary e-documents. In this case, a document name may be created automatically from date and consecutive number. In the above-described preferred embodiment, a file name is created from a character string capable of identifying a document name, date, and consecutive number when executing the e-document scan. As another example, a file name may be created from a character string capable of identifying a document name, and a consecutive number. Instead of determining the period of storage by the date when the document has been scanned as a reference date, the period of storage may be determined from the term of storage with a date when the document has been created as a reference date, and the period of storage may be entered manually.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image scanning device comprising:
   means for scanning a document and generating an image signal;
   means for storing documents as different document types in a document folder with a timestamp or in a temporary document folder without a timestamp;
   means for requesting a time authentication which includes means for controlling to store the scanned document generated by the means for scanning in the means for storing documents; and
   wherein, when a document type is selected and storing of a document in the document folder of the means for storing documents is instructed, the means for controlling instructs the means for scanning to scan a document, acquires a timestamp, and then stores the scanned document and the timestamp in the document folder of the means for storing documents which is used for the selected document type; when a document type is selected and storing of a document in the temporary document folder of the means for storing documents is instructed, the means for controlling stores the scanned document generated by the means for scanning the document and generating the image signal in the temporary document folder of the means for storing documents which is used for the selected document type; and when a document type in the temporary document folder of the means for storing documents is selected and assigning the timestamp is instructed by selecting the scanned document stored in the temporary document folder which is used for such a document type, the means for controlling acquires the timestamp of the selected scanned document, and then stores the selected scanned document and the timestamp in the document folder which is used for the selected document type.

2. A control method of an image scanning device comprising the steps of:
   scanning a document and generating an image signal;
   assigning a timestamp to the image signal generated at the scanning step, and storing the image signal assigned with the timestamp in a first document folder of a memory;
   temporarily storing image data without assigning the timestamp in a second document folder of said memory; and
   selecting the image data stored in second folder; assigning a timestamp to said selected image data and storing the image signal assigned with the timestamp in the first document folder of said memory.

* * * * *